United States Patent [19]

Hyodo et al.

[11] Patent Number: 4,911,885
[45] Date of Patent: Mar. 27, 1990

[54] HIGH CARBON CHROMIUM BEARING STEEL

[75] Inventors: Yoshiaki Hyodo; Masamichi Shibata, both of Osaka; Toshihiro Miyakawa, Tokyo, all of Japan

[73] Assignees: Koyo Seiko Co., Ltd., Osaka; Nippon Koshuha Steel Co., Ltd., Tokyo, both of Japan

[21] Appl. No.: 331,378

[22] Filed: Mar. 31, 1989

[30] Foreign Application Priority Data

Apr. 4, 1988 [JP] Japan ................. 63-83920

[51] Int. Cl.$^4$ ............................. C22C 38/40
[52] U.S. Cl. .................... 420/112; 420/100; 148/906
[58] Field of Search ............ 420/112, 100; 148/906, 148/333

[56] References Cited

U.S. PATENT DOCUMENTS

FOREIGN PATENT DOCUMENTS

| 3,929,523 | 12/1975 | Kinoshi et al ............ 148/143 |
| 1458424 | 7/1970 | Fed. Rep. of Germany ...... 420/112 |
| 57-210954 | 12/1982 | Japan ............ 420/100 |
| 10111 | 10/1923 | European Pat. Off. |
| 350752 | 6/1931 | United Kingdom . |

Primary Examiner—Deborah Yee
Attorney, Agent, or Firm—Wenderoth, Lind & Ponack

[57] ABSTRACT a high carbon chromium bearing steel having a carbon content from 0.8% to 1.2% by weight, and which is characterized by a nickel content of 1.0% to 2.0% by weight, a chromium content of 0.9% to 2.0% by weight, a silicon content of 1.0% to 2.0% by weight, and a sulfur combined and phosphorus content of 0.015% to 0.040% by weight.

2 Claims, 5 Drawing Sheets

CONDITIONS
LOAD: MAXIMUM CONTACT PRESSURE
$P_{max} = 440$ kgf/mm$^2$
SPEED: NO. OF STRESS REPETITIONS
30,000 cpm NUMBER OF STRESS REPETITIONS ($\times 10^7$ cycles)

WEIBULL CHART

HIGH CARBON CHROMIUM BEARING STEEL

BACKGROUND OF THE INVENTION

The present invention relates to a high carbon chromium bearing steel which is used as a material for bearings having extremely outstanding rolling fatigue life.

The rolling fatigue life of a rolling bearing generally ends with the flaking of its raceway surfaces which are in a rolling contact with rolling elements. There are, however, two types of such flaking, that is, surface origin flaking originating in damage caused on the surface during use, and internal origin flaking originating in non-metallic inclusions present near the point of maximum shear stress below the aforementioned raceway surfaces. In order to prolong the rolling fatigue life (hereinafter simply "life"), hardness is increased to make it harder to scratch the surface, thereby prolonging the life with respect to the aforementioned surface origin flaking, and the content of non-metallic inclusions is reduced to reduce sources of cracks, thereby increasing the life with respect to the forementioned internal origin flaking. Furthermore, samples (Japanese patent laid-open no. 61-272349) in which the life has been prolonged by limiting the sulfur and phosphorus content, both of which are unavoidable impurities, to less than 0.010% by weight, and samples (Japanese patent laid-open no. 60-194047) in which the life has been prolonged by adding silicon in an amount of 0.15% to 1.6% by weight are known.

Conventionally, high carbon chromium bearing steels used for rolling bearings with consideration given to the aforementioned problems include high carbon chromium bearing steels (SUJ1 to SUJ5) as specified in Japan Industrial Standards (JIS) G4805. Of these, SUJ2 s most common. This SUJ2 steel is characterized by carbon in an amount of 1% by weight and chromium in an amount of 1.5% by weight; the structure of this steel is martensitized in the quench and temper heat process, and SUJ2 is generally used with approximately 10% residual austenite and approximately 7% non-solute carbide content. A hard coating is also provided in certain circumstances.

However, insofar as the aforementioned SUJ2 metal is used, there is a limit to the hardness which relates to the aforementioned surface origin flaking. Furthermore, when a hard coating is applied to the surface, the interfacial strength between the coating layer and the matrix is low. Furthermore, with respect to the internal origin flaking, we have almost approached the limit to the reductions which can be realized in non-metallic inclusions using current production methods, and the prospects for further significant reductions in non-metallic inclusion content are not good.

SUMMARY OF THE INVENTION

Therefore, the object of the present invention is to provide a high carbon chromium bearing steel, paying attention to the fact that minute cracks develop from the origin of flaking, which makes it possible to restrain the occurrence and development of the minute cracks by improving the toughness of the matrix, and is therefore able to prolong the life of rolling bearings in which this steel is used.

In order to achieve the aforementioned objective, the present invention provides a high carbon chromium bearing steel having a carbon content of 0.8% to 1.2% by weight and characterized by a nickel content of 1.0% to 2.0% by weight, a chromium content of 0.9% to 2.0% by weight, a silicon content of 1.0% to 2.0% by weight, and a combined sulfur and phosphorus content of 0.015% to 0.040% by weight.

The reasons for limiting the nickel content to 1.0% to 2.0% by weight (hereafter simply percent (%)) in a high carbon chromium bearing steel according to the present invention are as follow. Specifically, as was hereinbefore described, the life of a rolling bearing under rolling contact is normally achieved when flaking of the raceway surface is caused by cracks resulting from repeated shear stress under high contact stress and the development of said cracks. Therefore, in order to improve said life, it is necessary to suppress the occurrence of said cracks and the development of said cracks having once formed. Thus, improving the toughness f the matrix of the high carbon chromium bearing steel is an extremely effective means of improving the life of rolling bearings in which this steel is used. The nickel is an effective element for improving the toughness of this matrix. The fracture toughness and the number of stress repetitions to give rise to crack initiation (hereafter, simply "crack initiation cycles") in the repeated compression test were selected to evaluate the improvement in the aforementioned matrix toughness. The following description is based on this test.

The nickel content is specified as 1% or greater because at less than 1% improvements in matrix toughness are blocked, an no major effect on the improvement of the fracture toughness or the crack initiation cycle values is confirmed. Furthermore, the nickel content is also specified as 2% or less because with a nickel content of greater than 2% both the crack initiation cycle and fracture toughness values improve but the residual austenite content also increases, and this has been confirmed to be related to reduced hardness, which as previously described is related to reduced bearing life. In other words, if the nickel content exceeds 2%, problems caused by reduced hardness resulting from an increased residual austenite content increase as the nickel content rises, and this results in shortened bearing life.

Chromium is a carbide-forming element and a hardenability improvement element, and is an effective element for adjusting hardenability and maintaining the hardness required for a bearing, as well as for minute spheroidizing of carbides in the steel, similarly to silicon discussed below. The amount of chromium content required to realize these benefits is at least 0.9%. Therefore, the minimum chromium limit is 0.9%. On the other hand, because large carbides are formed and it is possible that metal life is conversely decreased when the chromium content exceeds 2.0%, the upper limit to the chromium content range is 2.0%.

Silicon content is limited to the range of 1.0% to 2.0%, both inclusive, for the following reasons. Silicon is a matrix strengthening element and is an element which increases temper softening resistance, and is therefore an effective element for improving bearing life. Therefore, the minimum required silicon content is approximately 1.0%. On the other hand, if the silicon content exceeds 2.0%, decarburization due to heating in the spheroidizing annealing process and quenching process becomes severe, and the benefits of improved bearing life are lost. Furthermore,, cold processability is also decreased. Therefore, 1.0% is the lower limit and 2.0% is the upper limit to the silicon content range.

Sulfur and phosphorus content is limited to the range of 0.015% to 0.040% for the following reasons. In general, when the toughness of the matrix is increased, the machinability decreases. Sulfur and phosphorus are unavoidable impurities in steel, and it is generally considered necessary to minimize the sulfur and phosphorus content as much as possible in order to improve the life. The present inventors, however, have studied the relationship between the sulfur and phosphorus content and machinability with the objective of compensating for the reduced machinability accompanying the improvement in matrix toughness as described above. As a result, it was found that if the sulfur and phosphorus content was less than 0.015%, machinability drops when compared with conventional bearing steel, and if the sulfur and phosphorus content is greater than 0.040%, bearing life decreases significantly due to segregation toward the grain boundary of the sulfur and phosphorus. Therefore, 0.015% is the lower limit and 0.040% is the upper limit to the sulfur and phosphorus content range.

As will be well understood from the above description about the reasons to specify the content ranges, toughness of the matrix of a bearing steel can be improved, thus suppressing crack occurrence and development, and rolling fatigue life can be increased by more than ten times when compared with conventional steels without losing temper softening resistance and hardness characteristics. Moreover, sulfur and phosphorus elements, which have been conventionally considered disadvantageous with respect to increasing rolling fatigue life, and which have required special technologies and extra costs to reduce their amounts are conversely actively used to make machinability equivalent to that of the conventional high carbon chromium bearing steel SUJ2. Specifically, rolling fatigue life can be increased using a heat treatment process not significantly changed from the quench and temper hardening process of SUJ2 and without reducing machinability.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF PREFERRED EMBODIMENTS

Figure 1:
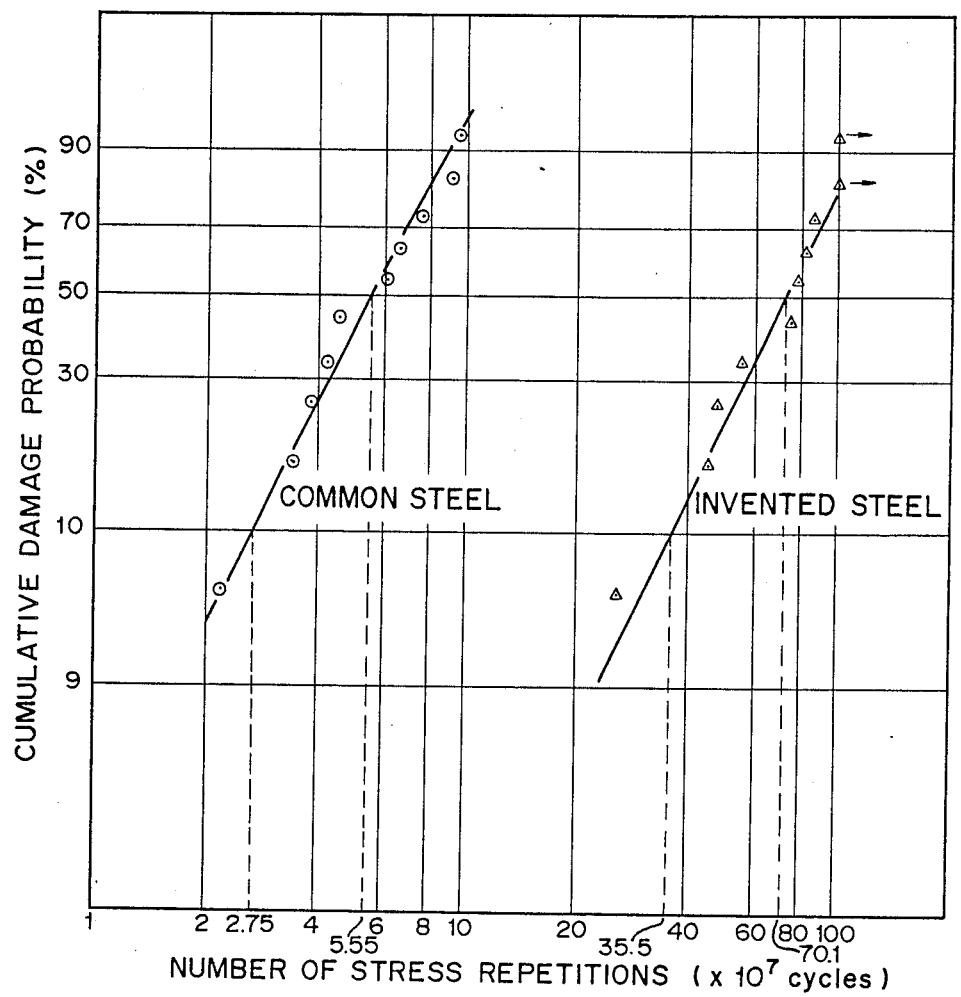
FIG. 1 is a graph plotted on a Wibull chart of rolling fatigue test results of a conventional steel and a high carbon chromium bearing steel according to the present invention.

In Table 1 is shown a comparison of specific preferred embodiments according to the present invention with a control sample and comparison samples; the top row is a standard high carbon chromium bearing steel (SUJ2) as a control sample, samples 1 and 2 are comparison samples, and samples 3, 4, and 5 are preferred embodiments according to the present invention. The heat treatment conditions for all samples are the same as follows. All the samples are kept at 835° C for 40 minutes and quenched in oil and then tempered at 180° C for 2 hours with air. From this Table 1, it can be seen that the preferred embodiments when compared with the standard bearing steel and the comparison samples have superior crack initiation cycles, superior fracture toughness and the same hardness as the standard bearing steel.

Samples 3, 4, and 5 in Table 1, each of which is a preferred embodiment according to the present invention, are high carbon chromium bearing steels with a carbon content from 0.8% to 1.2%, a silicon content from 1.0% to 2.0%, a chromium content from 1.0% to 2.0%, a manganese content from 0.2% to 1.0%, a nickel content from 1.0% to 2.0%, and a sulfur and phosphorus content from 0.015% to 0.040%, with the remaining constituent being iron.

TABLE 1

| Samples | | C (wt. %) | Si (wt. %) | Mn (wt. %) | P (wt. %) | S (wt. %) | Cr (wt. %) | Ni (wt. %) | Crack initiation cycles | Fracture toughness | Residual austenite (%) | Hardness (HRc) |
|---|---|---|---|---|---|---|---|---|---|---|---|---|
| Standard high carbon chromium bearing steel | | 1.00 | 0.30 | 0.30 | 0.009 | 0.005 | 1.47 | — | 1 | 1 | 11.0 | 62 |
| Comparisions | Sample 1 | 1.02 | 1.29 | 0.32 | 0.009 | 0.010 | 1.47 | 0.51 | 1.1 | 1.1 | 13.0 | 62 |
| | Sample 2 | 1.01 | 1.28 | 0.29 | 0.009 | 0.009 | 1.53 | 2.41 | 1.3 | 1.2 | 30.1 | 57 |
| Inventions | Sample 3 | 1.01 | 1.29 | 0.30 | 0.009 | 0.009 | 1.45 | 1.03 | 1.5 | 1.3 | 12.0 | 62 |
| | Sample 4 | 1.02 | 1.30 | 0.27 | 0.008 | 0.010 | 1.44 | 1.47 | 1.5 | 1.3 | 13.5 | 62 |
| | Sample 5 | 1.03 | 1.32 | 0.33 | 0.009 | 0.010 | 1.45 | 1.95 | 1.5 | 1.3 | 18.1 | 61 |

Note: The crack initiation cycles and fracture toughness are expressed as a ratio to the values of the standard high carbon chromium bearing steel sample, respectively.

In a rolling bearing steel, the hardness required to suppress plastic deformation caused by high contact stress is normally believed to be HRc 58–64, and a composition of 0.5%–0.6% carbon and 6%–8% non-solute carbides in the matrix is considered optimal with respect to life. With a carbon content of 0.8% to 1.2% in the preferred embodiments according to the present invention, this carbon content is approximately equal to that of the standard high carbon chromium bearing steel as shown in Table 1. The carbon content limits are 0.8% minimum and 1.2% maximum because if the carbon content is less than 0.8%, spheroidizing of the carbides becomes slightly difficult, and if greater than 1.2%, the formation of large carbides, which is an undesirable factor with respect to bearing life, becomes easier within the aforementioned chromium range. This is also true with the standard steel and the comparison samples.

The silicon content is discussed below. In a region at a depth at which maximum shear stress acts below a rolling contact surface, heat generation resulting from repeated shear stress invites a reduction in the matrix hardness and a reduction in plastic deformation resistance, namely, a reduction in temper softening resistance. Silicon, is a matrix strengthening element, and is an element which increases temper softening resistance, and as such is an effective element with respect to increasing metal life. The amount of silicon required to realize these benefits is a minimum of approximately 1.0%, and greater amounts of silicon increase metal life. On the other hand, when the silicon content exceeds 2.0%, decarburization due to heating in the spheroidizing annealing process and the hardening process becomes severe, and the benefits of improved bearing life are lost. Furthermore, cold processability is also decreased. Therefore, 1.0% is the lower limit and 2.0% is the upper limit to the silicon content range.

Chromium is a carbide-forming element and a hardenability improving element, and is an effective element for adjusting hardenability and maintaining the hardness required for a bearing, as well as for minute spheroidizing of carbides in the steel, similarly to the aforementioned silicon and manganese discussed below. The amount of chromium content required to realize these benefits is at least 0.9%. Therefore, the minimum chromium limit is 0.9%. On the other hand, because large carbides are formed and it is possible that metal life is conversely decreased when the chromium content exceeds 2.0%, the upper limit to the chromium content range is 2.0%.

The manganese content is 0.2% to 1.0% for the following reasons. The lower limit is 0.2% in order to achieve required hardenability and a residual austenite content comparable to the conventional SUJ2 steel, and the upper limit is 1.0% because, if more manganese is added, the residual austenite content rises and machinability is significantly lowered.

The nickel content is discussed below. As previously discussed, improving toughness to suppress the occurrence and development of cracks is an extremely effective means of increasing metal life, and nickel is an effective element with respect to improving matrix toughness. As shown in Table 1, the nickel contents of samples 3, 4, and 5, each of which is an embodiment of the present invention, are 1.03%, 1.47%, and 1.95%, respectively. The fracture toughness and crack initiation cycles, specifically the number of stress repetitions at which cracking occurred in the repeated compression test, of these samples 3, 4, and 5, when expressed as a ratio to the value of the standard high carbon chromium bearing steel, were 1.3, 1.3, and 1.3, and 1.5, 1.5, and 1.5, respectively. The fracture toughness and crack initiation cycles of each of samples 3, 4, and 5 have clearly improved 30% and 50%, respectively, when compared with the standard high carbon chromium bearing steel having no nickel content. As will be described hereinafter, this realizes a beneficial effect on the life. It is to be noted that the fracture toughness ratio of sample 1 with a 0.51% nickel content, a level below the minimum 1% nickel content according to the present invention, is 1.1, and that the crack initiation cycles ratio is 1.1, both values lower than those of the aforementioned samples 3, 4, and 5; no significant effect on the improvement of matrix toughness is confirmed with nickel additives less than 1.0%. Therefore, the lower limit of the nickel content is 1.0%. Furthermore, the ratio of fracture toughness and crack initiation cycles of sample 2 to the standard bearing steel, the 2.41% nickel content of which sample is greater than the 2.0% upper nickel content limit according to the present invention, are 1.2 and 1.3, respectively. Though these values are improved when compared with the standard high carbon chromium bearing steel, the residual austenite content also rises with an increase in the nickel content, and as a result, hardness (HRc), an element which directly effects metal life, significantly drops to 57 with improvements in matrix toughness, when compared with the hardness (HRc) 62 of the standard high carbon chromium bearing steel and the hardness (HRc) 62, 62, and 61 of samples 3, 4, and 5, respectively, according to the present invention. Thus, if the nickel content exceeds 2.0%, fracture toughness and crack initiation cycles, which are the indices to the improvement of metal life, improve to a certain degree, but hardness (HRc), which also contributes to improved metal life, drops, and overall the metal life is shortened. Therefore, the nickel content range is 1.0% to 2.0%.

Next, the sulfur and phosphorus content is discussed. As previously discussed, in general, improved matrix toughness can be observed as having a major effect on prolonging metal life, but this also results in reduced machinability. Sulfur and phosphorus are normally unavoidable impurities in steel, and it is generally considered necessary to minimize the sulfur and phosphorus content as much as possible in order to improve the life. The present inventors, however, have studied the relationship between the sulfur and phosphorus content and machinability with the objective of compensating for reduced machinability accompanying the improvement in matrix toughness as described above. As the result of the tests in which the machinability of the samples was evaluated b measuring tool life during machining of the samples under the same cutting conditions using tools of the same type and condition, it was found that when the sulfur and phosphorus content was less than 0.015%, machinability dropped 10% when compared with the common bearing steel (standard high carbon chromium bearing steel). This greatly affects bearing manufacturability, an reduces it. On the other hand, it was confirmed that metal life was greatly shortened when the sulfur and phosphorus content was greater than 0.040% due to the coarseness of carbides and segregation toward the grain boundary of the sulfur and phosphorus. Therefore, the sulfur and phosphorus content is from 0.015% to 0.040%.

Figure 3:
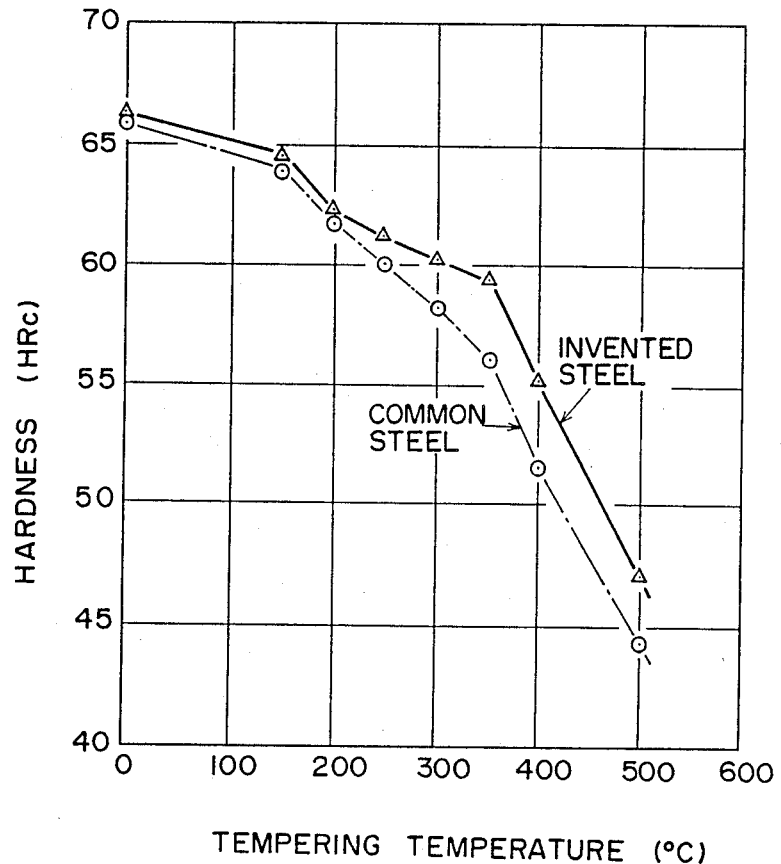
FIG. 3 is a graph showing the relation between tempering temperature and hardness with respect to a common steel and a high carbon chromium bearing steel according to the present invention.

FIG. 3 shows the relation between tempering temperature (° C) and hardness (HRc) with respect to the sample 3 as the invented steel and the common bearing steel (standard high carbon chromium bearing steel). The heat treatment conditions for them are the same as in Table 1. As shown in FIG. 3, the invented steel exhibits less deterioration in hardness with relation to tempering temperature than the common steel Especially, the hardness of the invented steel deteriorates less above a tempering temperature 250° than the common steel. All the samples have the form of a rod of 20 mm diameter and 20 mm long.

Figure 4:
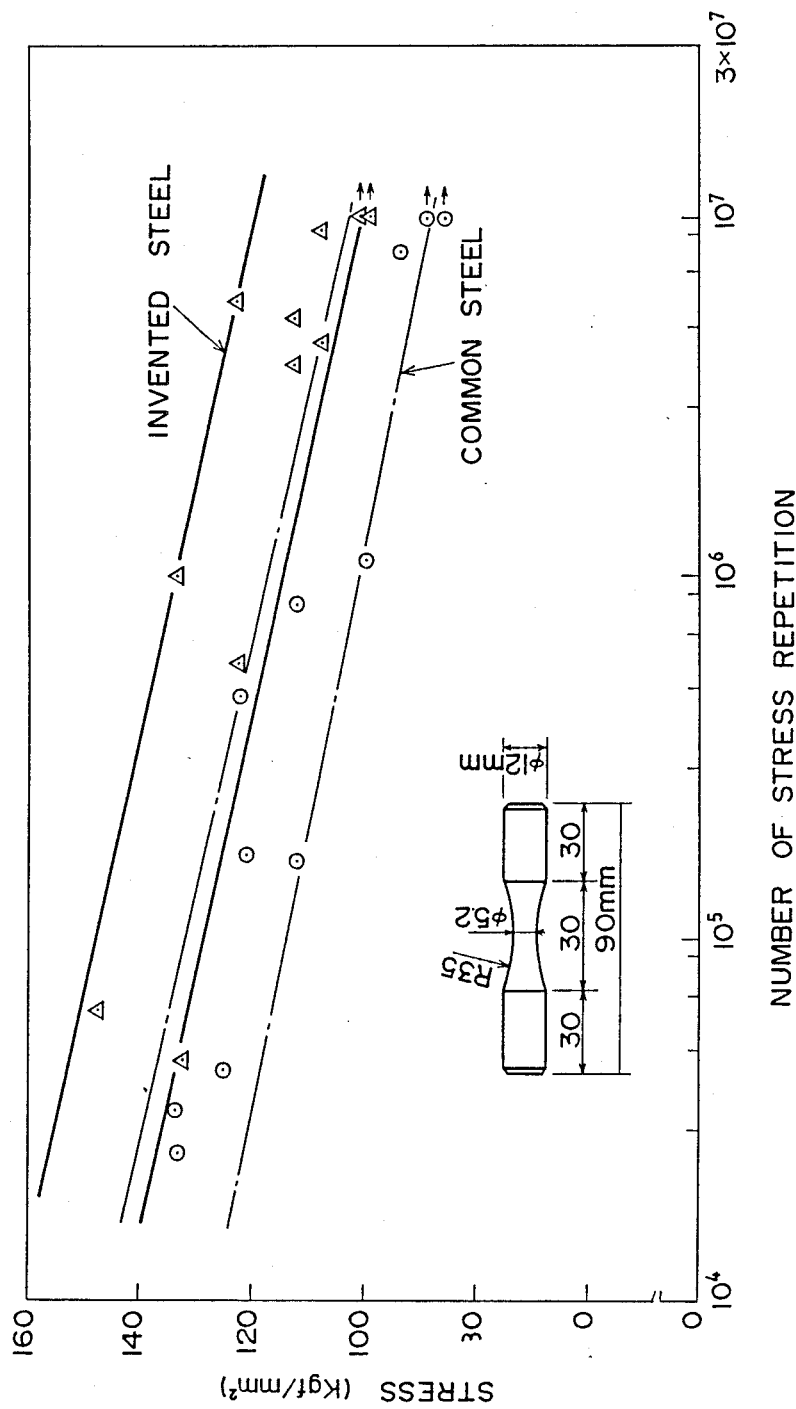
FIG. 4 is a graph showing the result of a fatigue test of the common steel and the invented steel which are given bending stress as they are rotated.

FIG. 4 shows the result of fatigue test of the sample 3 and the common steel which are given bending stress and rotated. The abscissa shows the number of stress repetition, and the ordinate shows the stress (Kgf/mm$^2$). The form and size of samples are described in FIG. 4. As can be understood from FIG. 4 the number of stress repetitions in the invented steel (sample 3) when it broke under the same condition as the common steel, increased remarkably when compared with the common steel (SUJ2). In other words, the invented steel obtained even more strength in relation to fatigue under the condition of being given bending stress than the common steel. It was confirmed that a limit stress of the invented steel corresponding to the durability of stress repetitions of $10^7$ times was 105 Kgf/mm$^2$ and the corresponding limit stress of the common steel was 93 Kgf/mm$^2$, and the invented steel was improved in the limit stress more than 10 %, compared with the common steel. This contributes very much to the prolongation of rolling fatigue life in a rolling bearing.

FIG. 1 is a plot on a Weibull chart of the results of a rolling fatigue life test using a specified number of cylindrical rollers of 20 mm diameter and 20 mm length manufactured from the sample 3 high carbon chromium bearing steel and standard high carbon chromium bearing steel in Table 1. Test conditions were 440 kgf/mm$^2$ of maximum contact stress (Pmax), and $3 \times 10^4$ cpm of stress repetitions per minute. The abscissa shows the repeated stress cycles, and the ordinate shows cumulative failure probability. As is shown in FIG. 1, the life (cycles) of test samples manufactured from the Sample 3 high carbon chromium bearing steel (the invented steel in the figure) having a 1.03% nickel content improves significantly when compared with the life of test samples manufactured from the standard high carbon chromium bearing steel (common steel in the figure) to which nickel is no added.

The life of the test samples according to the invented steel is 12.9 and 12.6 times as long as those of the test samples according to the common steel with respect to the 10% life and 50% life, respectively, i other words, at the points of 0% and 50% of the cumulative failure probability.

Figure 5:
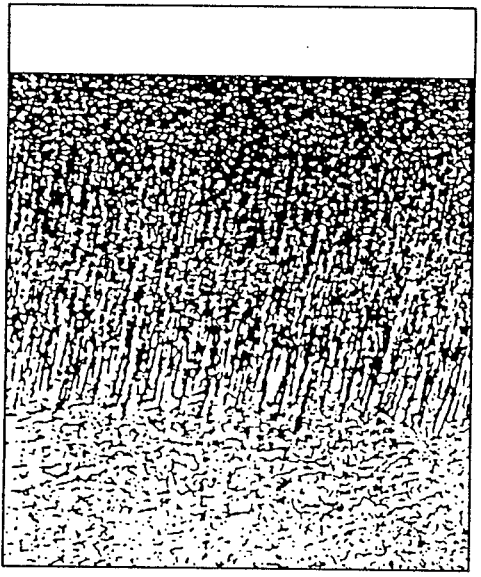
FIG. 5 illustrates the change of texture developed in the area caused a maximum shear stress under a raceway surface of bearing of the common steel.

FIG. 5 schematically shows the change of texture developed in the area caused a maximum shear stress under a raceway surface of a bearing of the common steel in a rolling fatigue life test. As can be understood from FIG. 5, the common steel exhibits the change of texture in the form of parallel and bias stripes. The common steel developed a flaking, a part caused the change of texture becoming an origin of flaking. On the other hand, the invented steel, that is, the sample 3 does not exhibit any change of texture and , of course, does not have any flaking even after stress repetitions of $1.0 \times 10^9$ more than that of $9.5 \times 10^7$.

Figure 2:
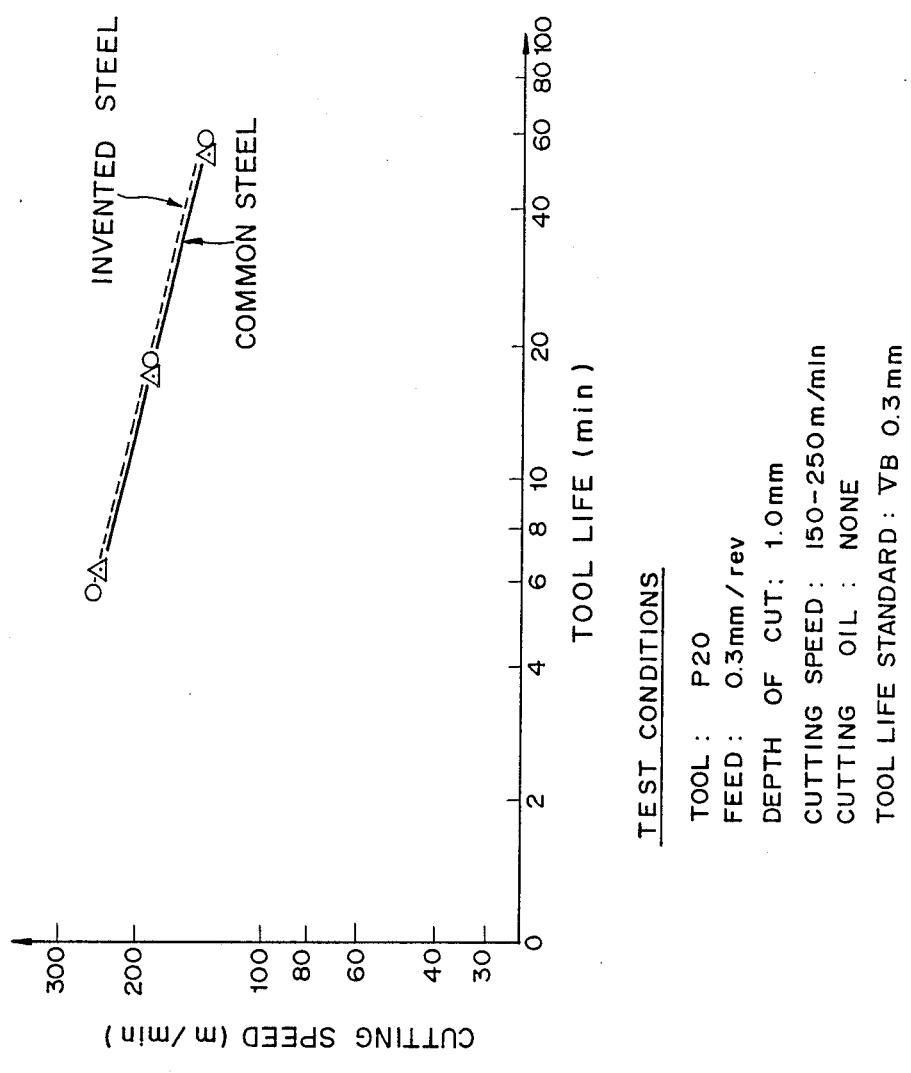
FIG. 2 is a graph showing results of the machinability of a high carbon chromium bearing steel of the present invention and the conventional steel.

FIG. 2 is a graph f the results on the machinability of the sample 3. The sample 3 contains 1.03% nickel, significantly increasing the toughness of the matrix when compared with the standard high carbon chromium bearing steel (SUJ2), and thus realizing a significant improvement in life. However, as previously discussed, because there are problems with high matrix machinability, the sulfur and phosphorus content has, for the previously discussed reasons, been increased from the 0.014% of the standard high-carbon chromium bearing steel (SUJ2) to 0.018%, thereby maintaining machinability comparable to that of conventional SUJ2. The test conditions were P20 (JIS B4104) tool carbide, 0.3 mm/rev. of feed rate, 1.0 mm of depth of cut, 150–250 m/min. of cutting speed, no cutting oil, and 0.3 mm of tool life standard (VB) (average wear breadth on front relief surface). In FIG. 2, the abscissa shows the tool life (min.), and the ordinate shows the cutting speed (m/min.). As shown in FIG. 2, there was virtually no difference between the life of the tool used to cut Sample 3 (the invented steel in the figure) in which the sulfur and phosphorus content was increased to 0.018% and the life of the tool used to cut the standard high carbon chromium bearing steel (common steel in the figure) across the entire range of cutting speeds used in this test. In other words, the machinability of sample 3 is equivalent to the standard high carbon chromium bearing steel.

It will be obvious that the invention may be varied in many ways. Such variations are not to be regarded as a departure from the spirit and scope of the invention, nd all such modifications as would be obvious to one skilled in the art are intended to be included within the scope of the following claims.

What is claimed is:

1. A high carbon chromium bearing steel consisting essentially of 0.8% to 1.2% by weight of carbon, 1.0% to 2.0% by weight of nickel, 0.9% to 2.0% by weight of chromium, 1.0% to 2.0% by weight of silicon, and a combined content of 0.015% to 0.040% by weight of sulfur and phosphorus, the balance of the steel being iron and unavoidable impurities.

2. A high carbon chromium bearing steel as claimed in claim 1, further containing 0.2% to 1.0% by weight of manganese.

* * * * *